April 17, 1956  C. R. REITZEL  2,742,337
ADJUSTABLE HEIGHT FURNITURE
Filed July 9, 1954  5 Sheets-Sheet 1
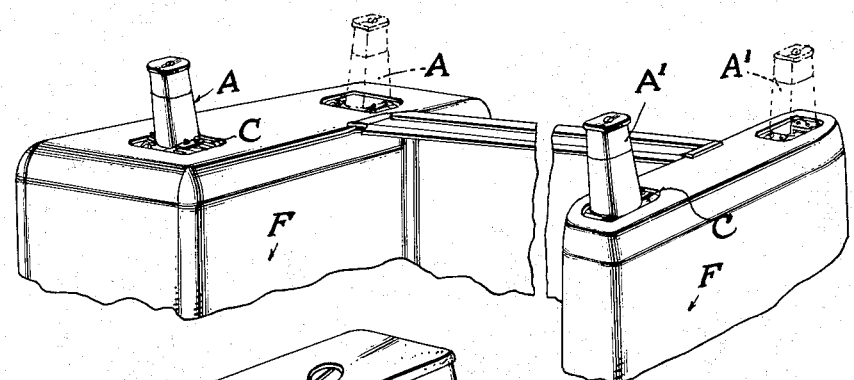
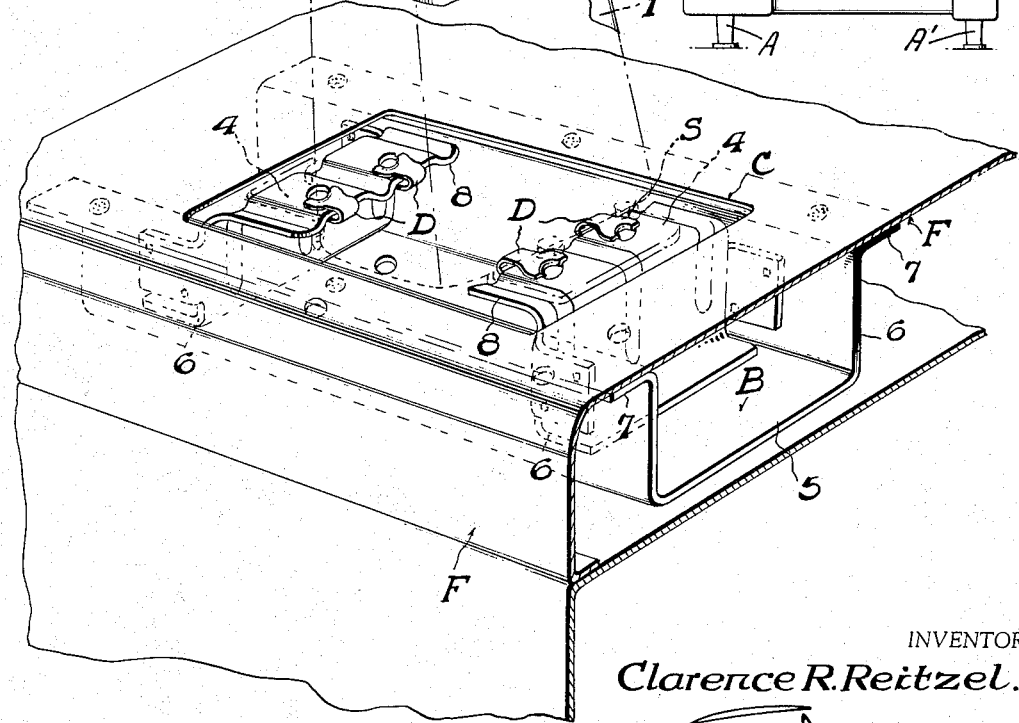
INVENTOR
Clarence R. Reitzel.
BY
ATTORNEY April 17, 1956  C. R. REITZEL  2,742,337
ADJUSTABLE HEIGHT FURNITURE
Filed July 9, 1954  5 Sheets-Sheet 2

INVENTOR
Clarence R. Reitzel.
BY
ATTORNEY

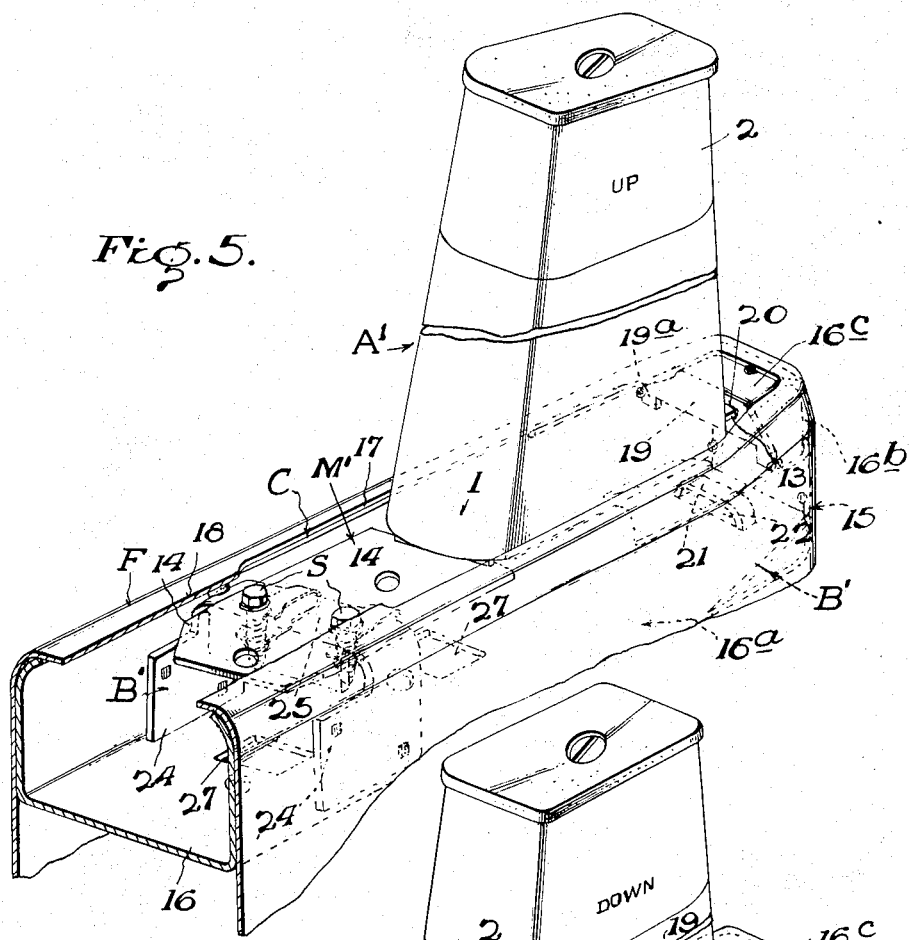
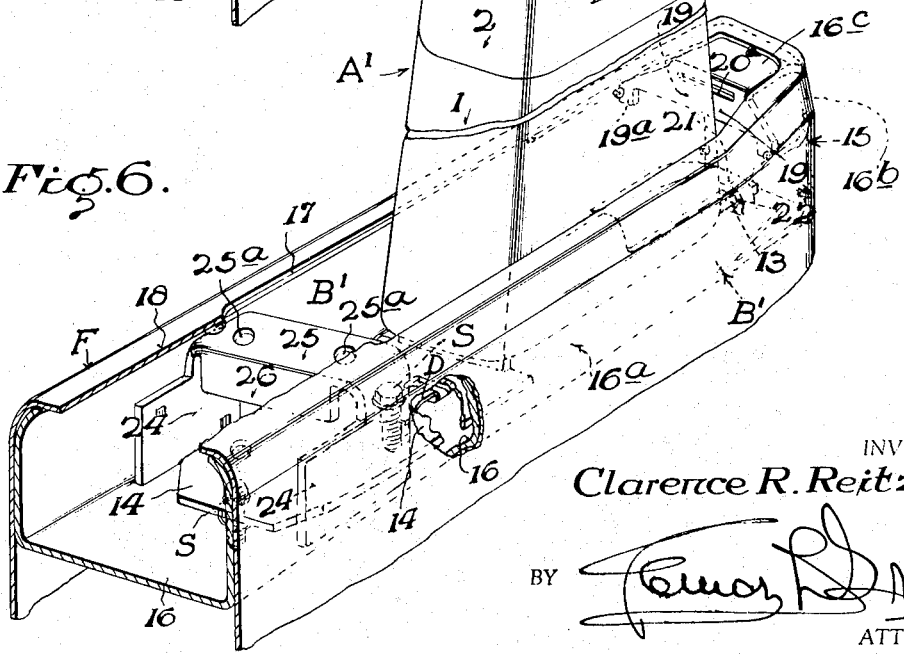

INVENTOR
Clarence R. Reitzel.

April 17, 1956 — C. R. REITZEL — 2,742,337
ADJUSTABLE HEIGHT FURNITURE
Filed July 9, 1954 — 5 Sheets-Sheet 5
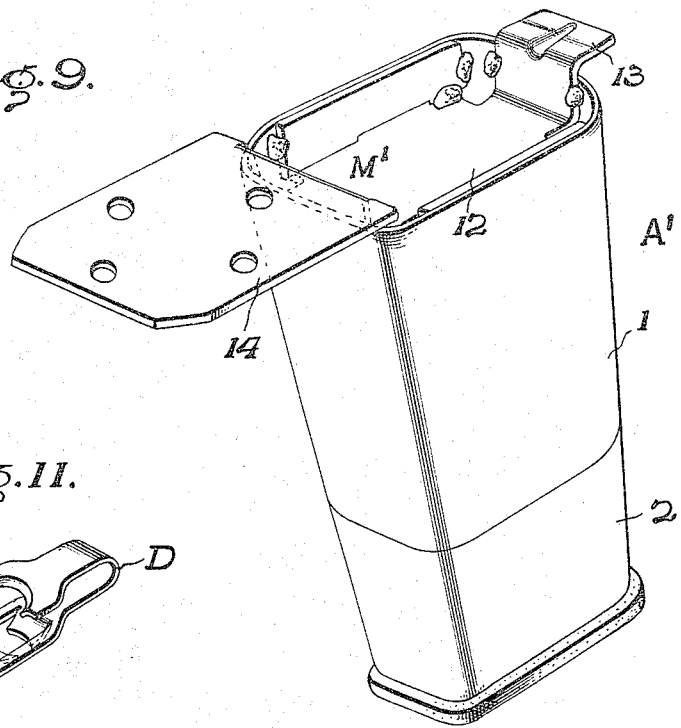
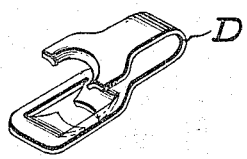
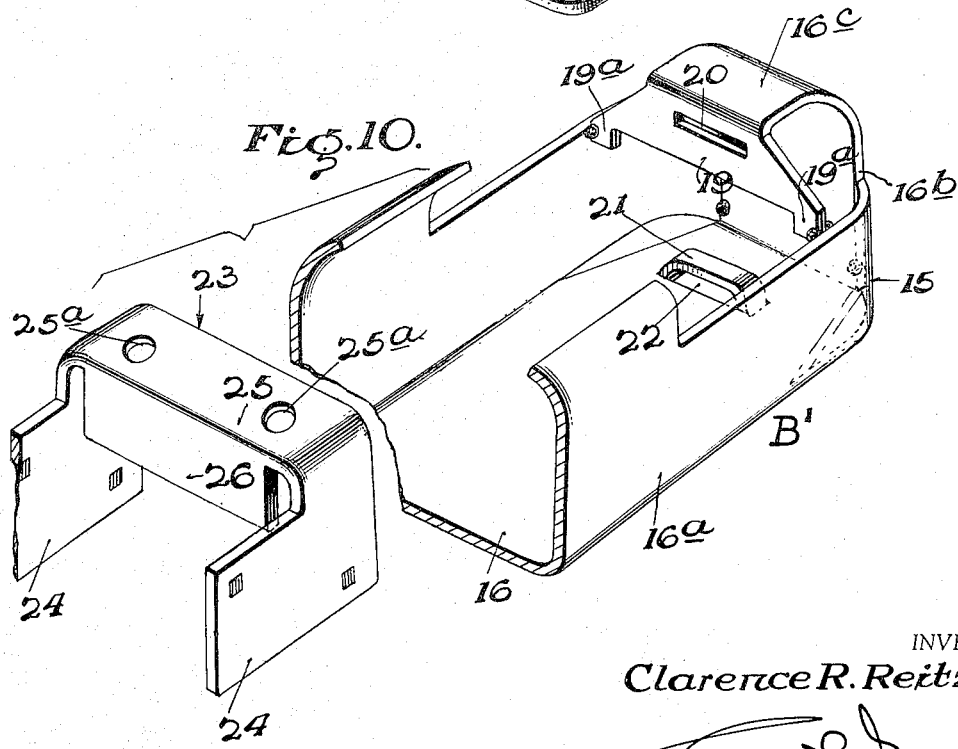
INVENTOR
*Clarence R. Reitzel.*
BY
ATTORNEY

United States Patent Office 2,742,337
Patented Apr. 17, 1956

2,742,337

ADJUSTABLE HEIGHT FURNITURE

Clarence R. Reitzel, Youngstown, Ohio, assignor to The General Fireproofing Company, Youngstown, Ohio, a corporation of Ohio Application July 9, 1954, Serial No. 442,233

11 Claims. (Cl. 311—39)

This invention relates to an improvement in legs for desks, tables or similar articles of furniture.

Desks, for example, metal desks for office or like use are furnished with tops at different heights above the floor. Heretofore, it has been the general practice to make the legs of one length for one height of desk and of another length for another height. Moreover, legs for desks with double drawer pedestals can use one type of leg whereas desks with, for example, one drawer pedestal and one pillar or flat columnar pedestal usually require different types of legs. This is because in the drawer type pedestal there is usually more area for attaching the leg to the desk framework than there is in the flat columnar type of pedestal.

Accordingly, the present invention in its general aspect has for one of its objects the provision of legs of standard uniform length and a mounting therefor which provides points or fastening grounds at two different levels either of which may be selected to provide a desk whose top is to be supported at a given height above the floor. Thus, the invention provides practical and effective means whereby the desk bodies may be manufactured according to predetermined style and design for stock and when desks with tops of a give height are to be made, the standard length legs may all be secured to selected fastening grounds of the same level.

Another object of the invention is to provide desk legs of uniform prefabricated length with attaching means at their inner or upper ends for use with complemental fastening grounds built in the pedestal, the arrangements being such that by simple manipulation of the leg and its attaching means relative to the fastening grounds, the legs may be positioned relative thereto for receiving permanent fastenings such as bolts or screws.

Preferred and practical embodiments of the invention are shown in the accompanying drawings, in which Fig. 1 is a perspective view of a portion of a desk turned bottom side up and including legs for a high desk top attached to the underside of a drawer pedestal.

Fig. 1a is a perspective view of a portion of a desk turned bottom side up and having a modified form of leg secured to a flat pedestal for a high desk top.

Fig. 2 is a perspective view of a leg assembly attached to a drawer pedestal with the leg, as per Fig. 1, secured in position to secure maximum desk height.

Fig. 2a illustrates a desk having legs of the present invention attached hereto for supporting a working top.

Figure 3:
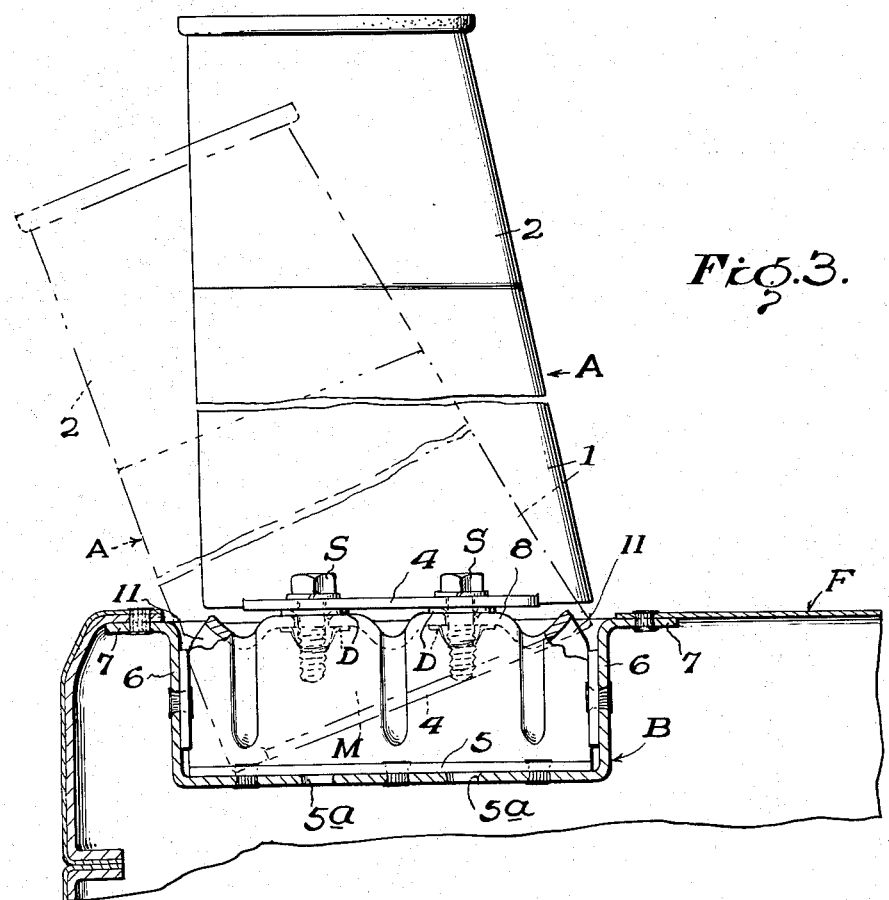
Fig. 3 is a side elevation of the leg of Fig. 2, shown in full lines; the dotted line position of the leg indicating how it is manipulated to become seated at the level for a desk with a low top.
Figure 4:
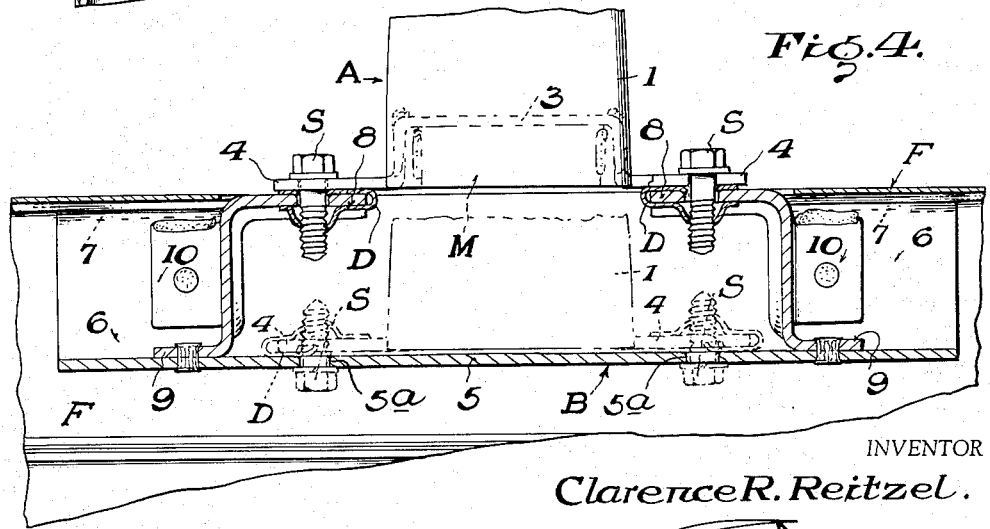

Fig. 4. is an end elevation of the leg of Figs. 2 and 3; the dotted lines showing the final position of the leg after it is manipulated according to Fig. 3 to secure it in position for a low desk top.

Fig. 5 is a perspective view of a leg, as per Fig. 1a, fitted to a flat pedestal securing assembly, and for a desk having a top of maximum height.

Fig. 6 is a view similar to Fig. 5 with the leg secured in position to provide a desk with a lower top.

Figure 7:
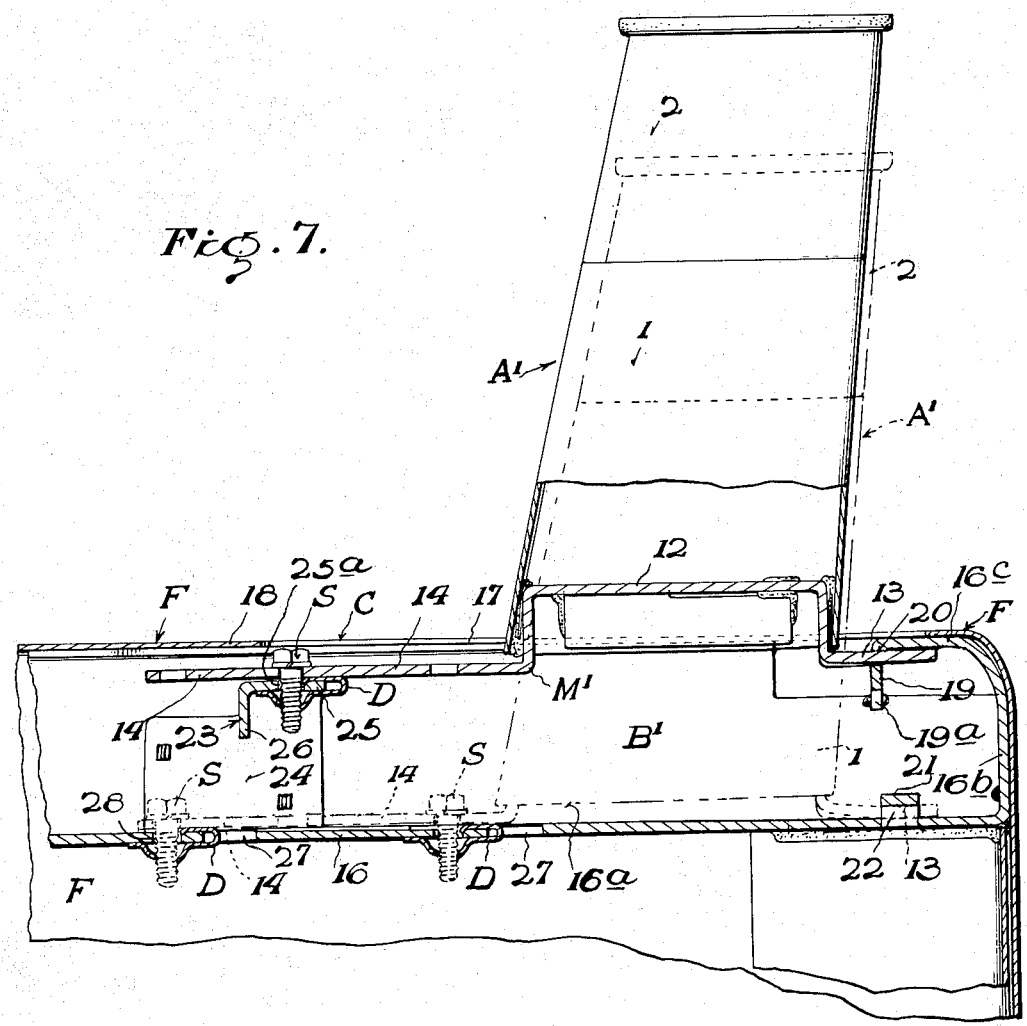

Fig. 7 is a partial vertical section of the leg of Fig. 5 and its securing ground.

Figure 8:
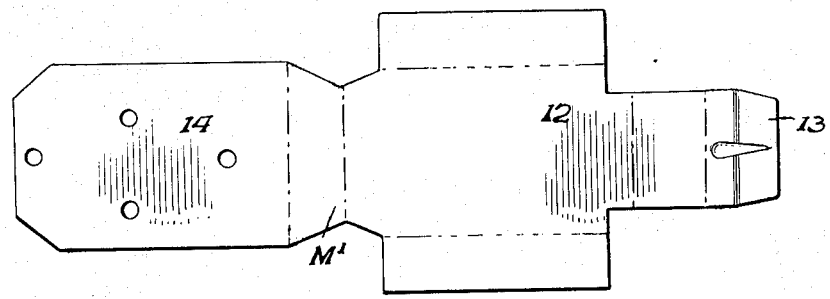

Fig. 8 is a plan view of the blank attaching member for the leg of Figs. 5–7.

Fig. 9 is a perspective view of the leg of Figs. 5–7 in its position of use to better illustrate its attaching member.

Fig. 10 is a perspective view of the securing ground for the leg attaching member of Figs. 5–9.

Fig. 11 is a perspective view of a screw holding clip which may be used at certain locations in lieu of tapping threads in a part to be joined by fastenings.

Similar reference characters designate corresponding parts in the several figures of the drawings.

As will be observed from the drawings, more particularly Fig. 1, the present improvements are concerned with adjustable leg height furniture tops where the adjustment is effected by special leg assemblies.

For example, the leg assemblies, designated generally as A—B and A'—B' have the common feature of providing legs A—A' of standard or uniform height, each provided with means at their upper or inner ends for cooperation with securing grounds B—B' fixed to the furniture framework and providing multiple level supports. Thus, if the desk or table top T is to be located at what may be termed the low position relative to the floor, for example twenty-nine inches, one set of low-level assemblies may be used for all four legs, while, on the other hand, if the desk top is to be supported at the high posiiton, for example thirty and one-half inches above the floor, high-level leg assemblies accomplishing this purpose may be used at all points of the furniture support.

Where, for example a desk includes two drawer pedestals, leg assemblies A—B may be used at all four points of support for the desk. On the other hand, if the desk includes one drawer pedestal and one relatively flat pedestal or column, leg assemblies of the type A'—B' may be used, as shown in Fig. 1. It will, of course, be understood that if the article of furniture is a table including only a pair of flat pedestals, all of the leg assemblies will be of the type designated generally as A'—B'.

Figs. 2–4 inclusive illustrate the leg assemblies A—B. Figs. 5–10 illustrate the leg assemblies A'—B'.

Referring generally to the leg assemblies A—B and A'—B', it may be pointed out that the upper or inner end of each leg, A or A', is provided with means for selectively engaging its related securing ground B or B' installed in the frame designated generally as F of the article of furniture, the said securing grounds B—B' being accessible through openings C in said frame F.

Observing first Fig. 2, it will be seen that the leg portion A of the assembly A—B includes a post or leg proper 1 having a foot 2 for resting on the floor, the said leg 1 being preferably hollow, as will be more clearly apparent from Figs. 3 and 4, thereby, to receive an offset portion 3 of a flanged attaching member M which offset portion 3 fits into the upper or inner end of the hollow leg, and, has integral therewith, the laterally extending flanges 4—4 which are provided with fastening receiving openings.

The securing ground B in Figs. 2–4 preferably includes a channel element having a bottom wall 5 providing the low level support, the side walls 6 and out-turned flanges 7 secured within the frame F at the location of the opening C. The transverse wall 5 of the channel is provided with fastening receiving openings 5a. Arranged transversely of the channel and secured between the bottom 5 and side walls 6, there is provided what may be conveniently termed high level supports 8. These supports are preferably of angular or Z-shape formation so that the flanges 9 may be secured to the wall 5 while the vertical wall of the angle may be provided with the wings 10 which for stability are welded or otherwise secured to the side walls 6 of the channel.

It will now be seen that the securing ground B includes vertically spaced low and high level supports 5 and 8 to which the flanges 4 of the leg may be selectively attached, depending on the height of the top of the item of furniture being fabricated.

In connection with the high level supports 8, it may be here pointed out that although they extend transversely between the walls 6 of the channel, they terminate short of each wall thereof to provide ingress slots or spaces 11 (Fig. 3) which, notwithstanding the fact that the high level supports 8 are rigid, the flanges 4 on the leg may be inserted in one aligned pair of ingress slots 11 as shown in Fig. 3. This figure shows (full lines) the legs 4 attached to the high level support 8, but when it is desired to connect the flanges 4 with the low level support 5, the leg 1 is tilted or canted in the direction of one of the side flanges so that said flanges 4 may freely pass through the ingress opening 11 and thus be positioned to engage the low level support 5. Of course, the openings 11 constitute egress paths if for any reason the leg must be moved from the low to high level position.

It will, of course, be understood that when the flanges 4 of the leg are engaged with either the low level support 5 or the high level support 8, they are secured thereto by fastenings S whose shanks fit into either tapped perforations in the members 5 and 8 or alternatively, so-called "Tinnermann" clips D may be used (Fig. 11). The high level supports 8 may be reinforced by corrugations as shown.

Referring now to the leg assembly A'—B' illustrated in Figs. 5-10, it will be understood that, as before, the hollow legs 1 are provided with suitable floor engaging feet 2. More particularly as will appear from Fig. 9 (made from blank of Fig. 8), the attaching members M' include a medial offset portion 12, secured within the hollow inner end of leg 1, and which has the oppositely extending flanges 13 and 14. The flange 13 serves more or less the function of a tongue or tenon since, as will later appear, it is intended to cooperate with related low and high level slot type supports.

The low and high level supports are embodied in the securing ground B' shown in detail in Fig. 10. The body of the securing ground B' is substantially in the form of a channel element 15 having bottom wall 16 and side walls 16a and which is secured within the frame F inserted in the opening C. At this point it may be noted that the opening C is wider at one end, as indicated at 17, than it is at the other end, as indicated at 18, so that a portion of 18 substantially overlies the high level bearing provided by bracket 23 to serve as a guide for the relatively long flange 14 of the attaching member when it is slid to high level position, as will presently appear.

The bottom wall 16 of the channel element 15, as will more clearly appear from Fig. 10, is, at one end, turned upwardly as indicated at 16b and then inwardly as at 16c, and the latter terminates in a depending end wall 19 having therein a high level horizontal slot 20, which, as will presently appear, forms a part of the high level support. The wall 19 is provided with opposite offset tangs 19a which are welded to the side flanges 16a of the body to provide a stable structure. The inturned portions of the side walls 16a are welded to the edge portions of the upturned portion 16b, as shown.

It may also be noted in connection with Fig. 10 that the bottom wall 16 is provided in the region of end wall 19 with an extruded strap 21 to form a slot 22 which is a part of the low level support.

The high level support complementary to 20 is formed by the bracket 23 which includes the side flanges 24 welded to the inner faces of the flanges 16a, and a top bearing portion 25 having openings 25a having a downturned reinforcing lip 26. Thus it will be apparent from Fig. 7, that the top bearing portion 25 is in alignment with the slot 20 and constitutes the other half of the high level support.

The low level support complementary to the slot 22 is provided by the bottom wall 16 of the channel element 15. As will be seen from Fig. 7, said bottom wall 16 is provided with longitudinally spaced finger inserting openings 27 which are contiguous to fastening receiving openings 28 to facilitate clips D being inserted through openings 27 and slid over the fastening receiving openings 28 so as to receive the screw fastenings S when the flange 14 of the leg bearing element M' rests thereon, as shown by dotted lines in Fig. 7.

According to the arrangement shown in Figs. 5-10, it will now be apparent that the leg assembly A', including the attaching member M', may be so manipulated so that its flange 14 will be passed into the opening C and then slid beneath the overhanging portions 18 of the frame to rest on the clips D fitted to the bearing support 25. Initially the leg assembly A' is moved to the left (Fig. 7) so as to permit the flange 13 to clear the wall 19 whereby said flange may be aligned with and then inserted into the opening 20. The flange 13 thus becomes securely held in the slot and the screw fastenings S may be then placed in the openings of the flange 14 which register with the openings in the top bearing element 24 to securely fasten the leg assembly A' in its high level position.

When it is desired to inserts the leg assembly A' to the low level position shown in Fig. 7, it is simply necessary to tilt the assembly so that the flange 14 may be inserted beneath the lower edge of 26 until it rests on the surface of the channel bottom 16. The leg assembly A' may be then moved toward the right (Fig. 7) until the flange 13 enters the slot or opening 22 provided by the strap 21. The paired openings in the flange 14 may then register with the openings 28 to receive the fastenings S.

From the foregoing it will now be seen that the objects of the invention are attained with the construction shown in Figs. 2-4 or with the construction shown in Figs. 5-10. In both forms of construction, a securing ground B or B' having low and high level supports is intended to cooperate with offset flanges 4—4 of leg A, Figs. 2-4, or the offset flanges 13 and 14 of leg A', Figs. 5-10, thereby in both instances making it possible to selectively attach the legs to the frame to support the top of the desk, or the like, at the desired height when the legs are being assembled on desk bodies at the time of fabrication.

I claim:

1. An article of furniture having a working top, a frame for supporting the top and having openings at the bottom side thereof, leg securing grounds located at and accessible through said openings, one of said grounds including a channel secured to the frame and having its horizontal wall constituting a low top supporting element, high top supporting elements spaced vertically from said horizontal wall and substantially flush with the mouth of the channel to constitute the other of said grounds, said elements terminating short of the sides of the channel to provide ingress spaces, and oblong legs having flanges projecting from opposite sides for selective engagement either with the low top supporting element by passing through said ingress spaces or with the outer faces of the high top supporting elements.

2. An article of furniture according to claim 1 wherein the high top supporting elements are disposed transversely of the channel and are a part of a substantially Z-shaped angles whose flanges opposite to the high top supporting elements are secured to the horizontal wall of the channel.

3. An article of furniture according to claim 1 wherein the oblong legs have their long axis disposed transversely of the channel and the flanges are on the long sides of the legs.

4. An article of furniture according to claim 1 wherein the upper ends of the legs are hollow and the flanges thereon are carried by an inwardly offset body secured in the hollow upper ends of the legs.

5. An article of furniture having a working top, a frame for supporting the top and having openings at the bottom side thereof, leg securing grounds located within and accessible through said openings, each of said grounds including, a channel element including a bottom and side walls and whose inner face constitutes a low level support and provided with fastening receiving openings spaced from a strap extruded from said bottom wall to provide a low level receiving slot, means on the channel element including a wall disposed in substantially the same plane as the strap and provided with a high level slot, and a high level bearing in the channel element including a transverse member provided with fastening receiving openings and aligned relative to said high level slot, and legs having oppositely directed flanges for selectively entering the high level slot and resting on the high level bearing or entering the low level slot and resting on the bottom of the channel element, and means for fastening said flanges to either the high level support or the bottom of the channel.

6. An article of furniture according to claim 5 wherein the wall having the high level slot is formed as the terminal portion of an arcuate extension of the bottom wall, and the high level bearing is formed by a transversely arched member having its side walls secured to the walls of the channel element.

7. An article of furniture according to claim 5 wherein the openings in the frame are wide where their major portions overlie the leg position and are narrow in the region of the high level bearing member, thereby to guide one of the flanges of the leg into seating position relative to the high level bearing member.

8. An article of furniture according to claim 5, wherein the high level bearing member is of transversely arched formation to provides a horizontal bearing aligned with the high level slot, said arched member including wings secured to the inner faces of the channel element, and said bearing is provided with an angular reinforcing lip which terminates sufficiently distant from the bottom of the channel to permit one of the flanges on the leg to move to the low level position.

9. An article of furniture according to claim 5 wherein the legs are hollow at their inner ends and the flanges are carried by an offset medial portion which fits into the hollow inner end of the leg.

10. Means for supporting an article of furniture having a working top to be supported at preselected different levels above the floor, comprising, in combination, a frame having a recess including an access opening, a low level attaching ground in the form of a wall located inwardly of said opening, a high level leg securing ground lying substantially in the plane of the mouth of said opening, said high level securing ground spaced outwardly relative to the low level securing ground formed by said wall, and a leg member of standard length having laterally projecting flanges lying in a common horizontal plane adapted selectively to engage one of said grounds, and fastenings for securing each of said flanges to the related juxtaposed securing ground.

11. Means for supporting an article of furniture having a working top to be supported at different pre-selected levels above the floor, comprising, in combination, a frame having a recess providing an access opening, a channel member having its side walls directed toward said opening and its web located inwardly of said opening to provide an inner wall constituting a low level securing ground, a high level leg securing ground fastened in the channel and having leg attaching portions substantially in the plane of the mouth of the opening, a leg member of given standard length, laterally projecting flanges carried by the inner end of the leg member, and fastening means for selectively securing each of said flanges to a related securing ground.

References Cited in the file of this patent

UNITED STATES PATENTS

| | | |
|---|---|---|
| 671,395 | Hayward | Apr. 2, 1901 |
| 1,714,435 | Possons | May 21, 1929 |
| 1,800,456 | Lawrence | Apr. 14, 1931 |
| 1,807,916 | Jones | June 2, 1931 |
| 1,950,710 | Woodhull | Mar. 13, 1934 |
| 2,110,005 | Rees | Mar. 1, 1938 |
| 2,163,049 | Merrill | June 20, 1939 |
| 2,305,870 | Haberstump | Dec. 22, 1942 |
| 2,544,822 | Brown | Mar. 13, 1951 |

FOREIGN PATENTS

| | | |
|---|---|---|
| 244,563 | Switzerland | Sept. 30, 1946 |
| 622,037 | Great Britain | Apr. 26, 1949 |